US010306905B2

(12) United States Patent
Cocchi

(10) Patent No.: US 10,306,905 B2
(45) Date of Patent: Jun. 4, 2019

(54) MACHINE AND METHOD FOR MAKING AND DISPENSING LIQUID FOOD PRODUCTS

(71) Applicant: ALI S.p.A.—CARPIGIANI GROUP, Milan (IT)

(72) Inventor: Andrea Cocchi, Calderara di Reno (IT)

(73) Assignee: ALI GROUP S.R.L.—CARPIGIANI, Cernuscosul (IT)

(*) Notice: Subject to any disclaimer, the term of this patent is extended or adjusted under 35 U.S.C. 154(b) by 251 days.

(21) Appl. No.: 14/956,797

(22) Filed: Dec. 2, 2015

(65) Prior Publication Data

US 2016/0157509 A1 Jun. 9, 2016

(30) Foreign Application Priority Data

Dec. 3, 2014 (IT) ............... BO2014A0682

(51) Int. Cl.
A23G 9/04 (2006.01)
A23G 9/12 (2006.01)
A23G 9/22 (2006.01)
A23G 9/28 (2006.01)

(52) U.S. Cl.
CPC ............ *A23G 9/045* (2013.01); *A23G 9/12* (2013.01); *A23G 9/228* (2013.01); *A23G 9/281* (2013.01)

(58) Field of Classification Search
CPC .......... A23G 9/045; A23G 9/12; A23G 9/228; A23G 9/28; A23G 9/281; A23G 9/16; A23G 9/166; A23G 9/222; F25C 2400/10; F25C 2301/002; F25C 5/00
USPC ..................... 62/68, 340, 344, 342
See application file for complete search history.

(56) References Cited

U.S. PATENT DOCUMENTS

| 4,329,853 A * | 5/1982 | Mills .................. A23G 9/20 137/890 |
| 4,680,944 A | 7/1987 | Menzel |
| 6,145,701 A * | 11/2000 | Van Der Merwe .... A23G 9/163 222/145.1 |
| 2007/0062212 A1* | 3/2007 | Frank .................. A23G 9/22 62/342 |
| 2008/0098765 A1* | 5/2008 | Bond .................. A23G 9/045 62/342 |

(Continued)

FOREIGN PATENT DOCUMENTS

EP 0179027 A2 4/1986
EP 1688046 A1 8/2006

(Continued)

OTHER PUBLICATIONS

Italian Search Report dated May 29, 2015 for related Italian Application No. BO20140682.

(Continued)

*Primary Examiner* — Joseph F Trpisovsky
(74) *Attorney, Agent, or Firm* — Shuttleworth & Ingersoll, PLC; Timothy J. Klima

(57) ABSTRACT

A machine for making and dispensing iced food products such as granitas, slush drinks and the like including: at least one closed and sealed chamber for containing and processing the product to be dispensed; a corresponding tank for feeding the basic ingredients needed for obtaining the product to be dispensed; a connecting pipe between an outlet of the tank and the inlet of the chamber; and a flow meter positioned along said pipe.

8 Claims, 11 Drawing Sheets

(56) References Cited

U.S. PATENT DOCUMENTS

| | | | | |
|---|---|---|---|---|
| 2012/0217264 A1* | 8/2012 | Cocchi | ............... | A23G 9/04 |
| | | | | 222/95 |
| 2014/0109770 A1* | 4/2014 | Kolar | ............... | A23G 9/30 |
| | | | | 99/275 |
| 2014/0134299 A1* | 5/2014 | Guidorzi | ............ | A47J 31/44 |
| | | | | 426/87 |

FOREIGN PATENT DOCUMENTS

| | | |
|---|---|---|
| EP | 2266416 A1 | 12/2010 |
| EP | 2371225 | 10/2011 |
| EP | 2491792 A1 | 8/2012 |
| EP | 2505070 A1 | 10/2012 |
| EP | 2578119 A1 | 4/2013 |

OTHER PUBLICATIONS

European Search Report dated Mar. 24, 2016 from counterpart EP App No. 15197570.3.

* cited by examiner

MACHINE AND METHOD FOR MAKING AND DISPENSING LIQUID FOOD PRODUCTS

This application claims priority to Italian Patent Application BO2014A000682 filed Dec. 3, 2014, the entirety of which is incorporated by reference herein.

BACKGROUND OF THE INVENTION

This invention relates to a machine for making and dispensing iced food products such as granitas, slush drinks and the like.

Machines of this kind, commonly known as crushed-ice drink makers or slush machines, generally comprise a transparent tank, in which a fluid is mixed and chilled and eventually dispensed in the form of a granita or slush drink through a tap mounted near the bottom of the tank.

The tank is closed at the top by a removable lid and contains at the bottom of it an evaporator of a refrigerating circuit and a screw type stirring element.

The tank is generally in the shape of a parallelepiped, with the exception of the bottom of it which is rounded in such a way as to partly surround the substantially cylindrical periphery of the stirrer-evaporator assembly and prevent the formation of zones of stagnant product.

The tank is filled manually from the top by removing the lid and pouring into the tank a mixture of water and/or milk and syrups, or a ready-made mix, depending on the flavor of the product to be dispensed.

In some cases, it may be commercially advantageous for a manufacturer of machines of this kind to deliver a machine to a customer under a contract of loan for use.

Under the contract, the customer is obliged to use the machine solely and exclusively with the product mixes or syrups supplied by the machine manufacturer.

Current machines, however, do not give the manufacturer effective possibilities of checking use of the machine by the customer.

More specifically, the manufacturer has no way of checking—with any degree of certainty—that the customer complies with the contract, that is to say, that the customer uses only the product mixes or syrups supplied by the manufacturer.

SUMMARY OF THE INVENTION

This invention has for an aim to provide a machine for making and dispensing iced food products such as granitas, slush drinks and the like and which allows the manufacturer to check use of the machine by the customer. It is, in particular, an aim of the invention to provide a machine for making and dispensing iced food products such as granitas, slush drinks and the like and which allows the manufacturer to ensure that the customer uses only the product mixes or syrups supplied by the manufacturer.

This aim is fully achieved by the machine for making and dispensing iced food products such as granitas, slush drinks and the like according to the present disclosure.

BRIEF DESCRIPTION OF THE DRAWINGS

The technical features and advantages of the invention are more apparent in the following description of a preferred embodiment of it, illustrated by way of non-limiting example in the accompanying drawings, in which:

FIG. 1 is a perspective view of an embodiment, according to the invention, of a machine for making and dispensing iced food products such as granitas, slush drinks and the like;

DESCRIPTION OF THE PREFERRED EMBODIMENTS

Figure 1:
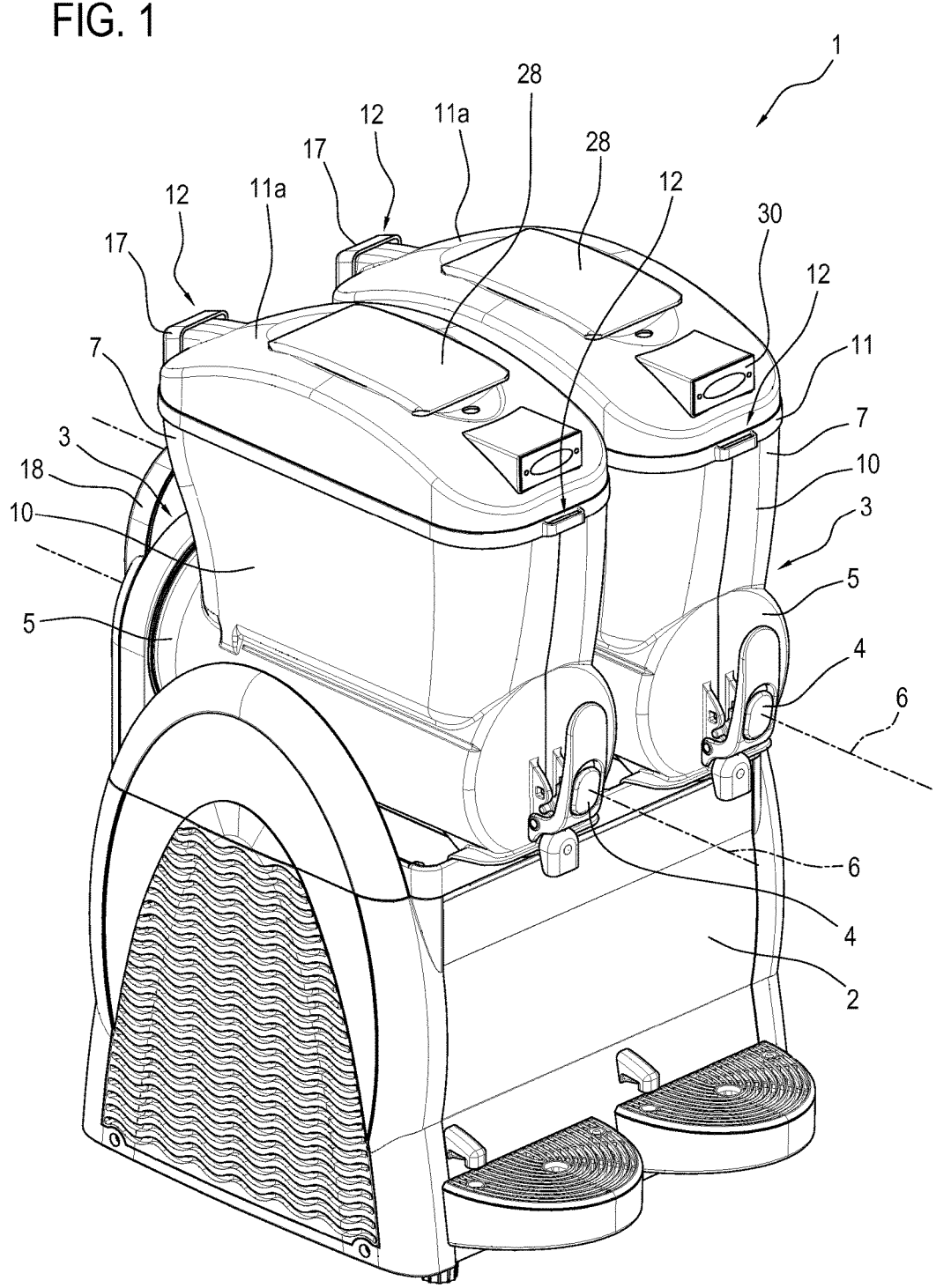

In FIG. 1, the reference numeral 1 denotes in its entirety a machine for making and dispensing iced food products such as granitas, slush drinks and the like.

The machine 1 comprises a base 2 that houses a customary refrigerating circuit, not illustrated.

Mounted side by side on the base 2 (by way of non-limiting example) are two transparent containment chambers 3, in each of which a fluid is processed, or more specifically, mixed and chilled, and eventually dispensed in the form of a granita, slush drink or the like, through a tap 4 mounted at the front of the machine 1, near the bottom of the chamber 3 itself.

It should be noted that according to the invention, the base 2 might have just one transparent chamber 3 mounted on it.

Each chamber 3 has a substantially cylindrical bottom portion 5 that extends around a horizontal axis 6 and a substantially parallelepiped shaped upper portion 7.

Figure 2:
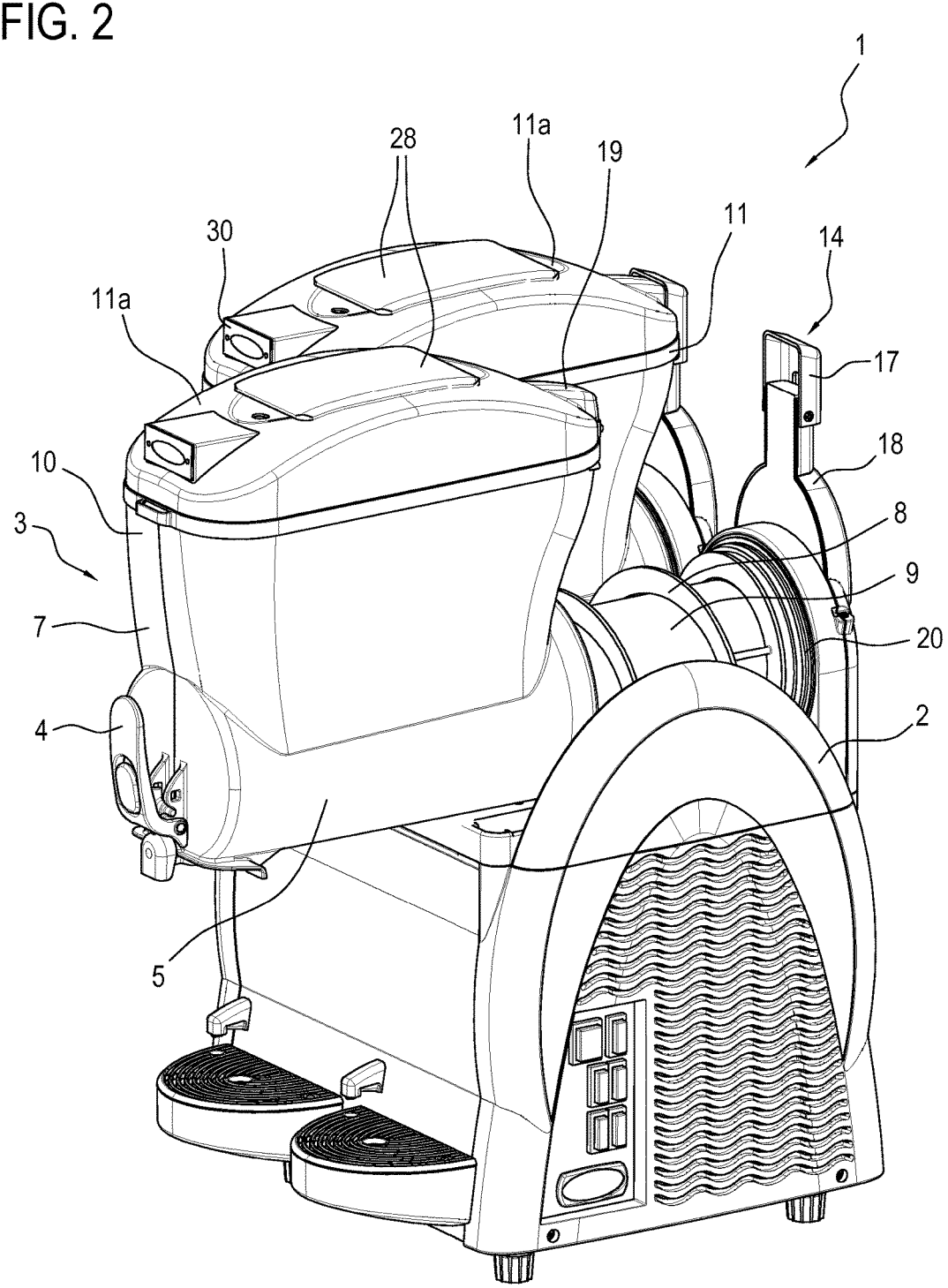
FIG. 2 shows the machine of FIG. 1 in a partly disassembled configuration.
Figure 4:
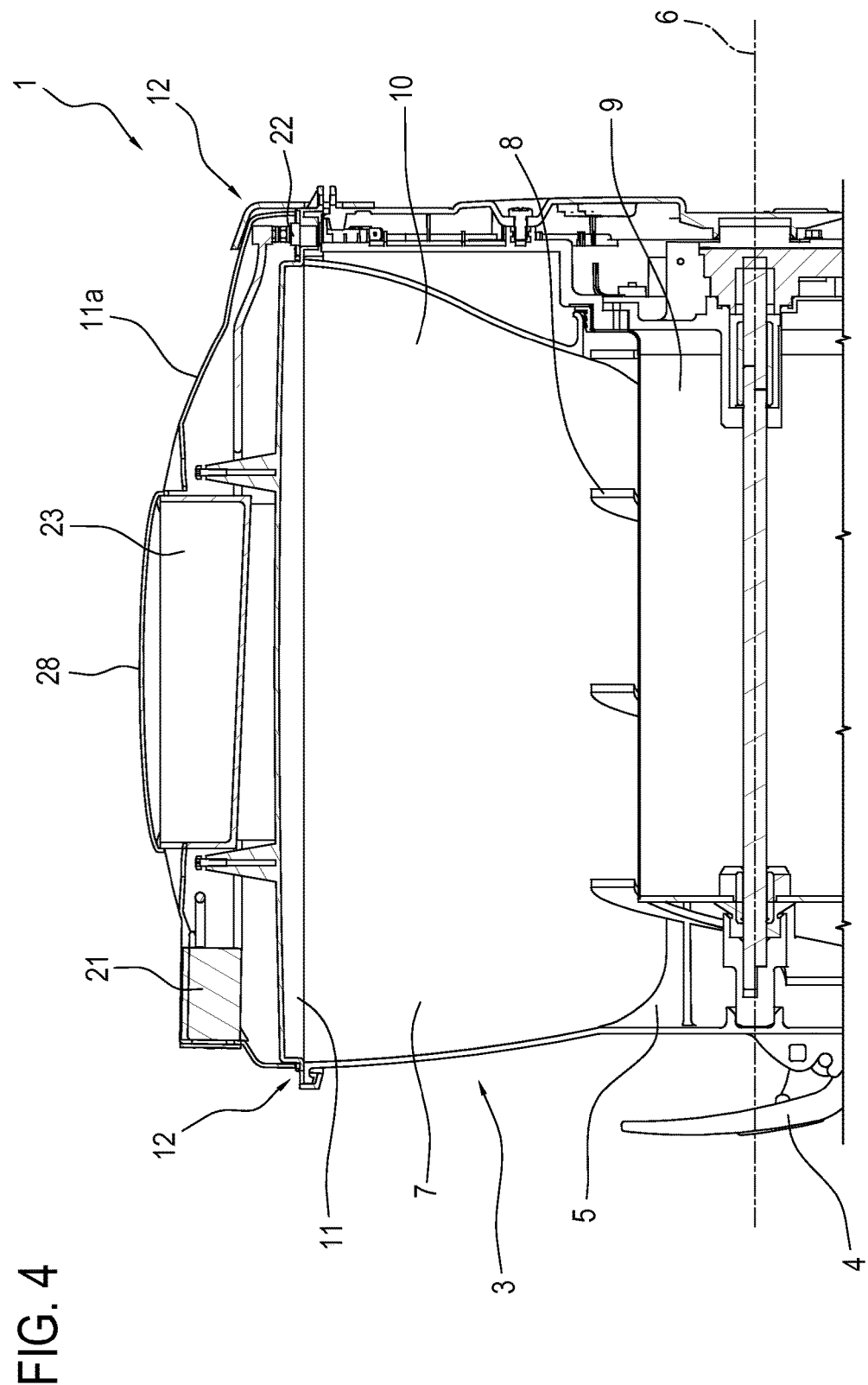
FIG. 4 is a transverse cross section of a portion of the machine of FIG. 1.
Figure 5:
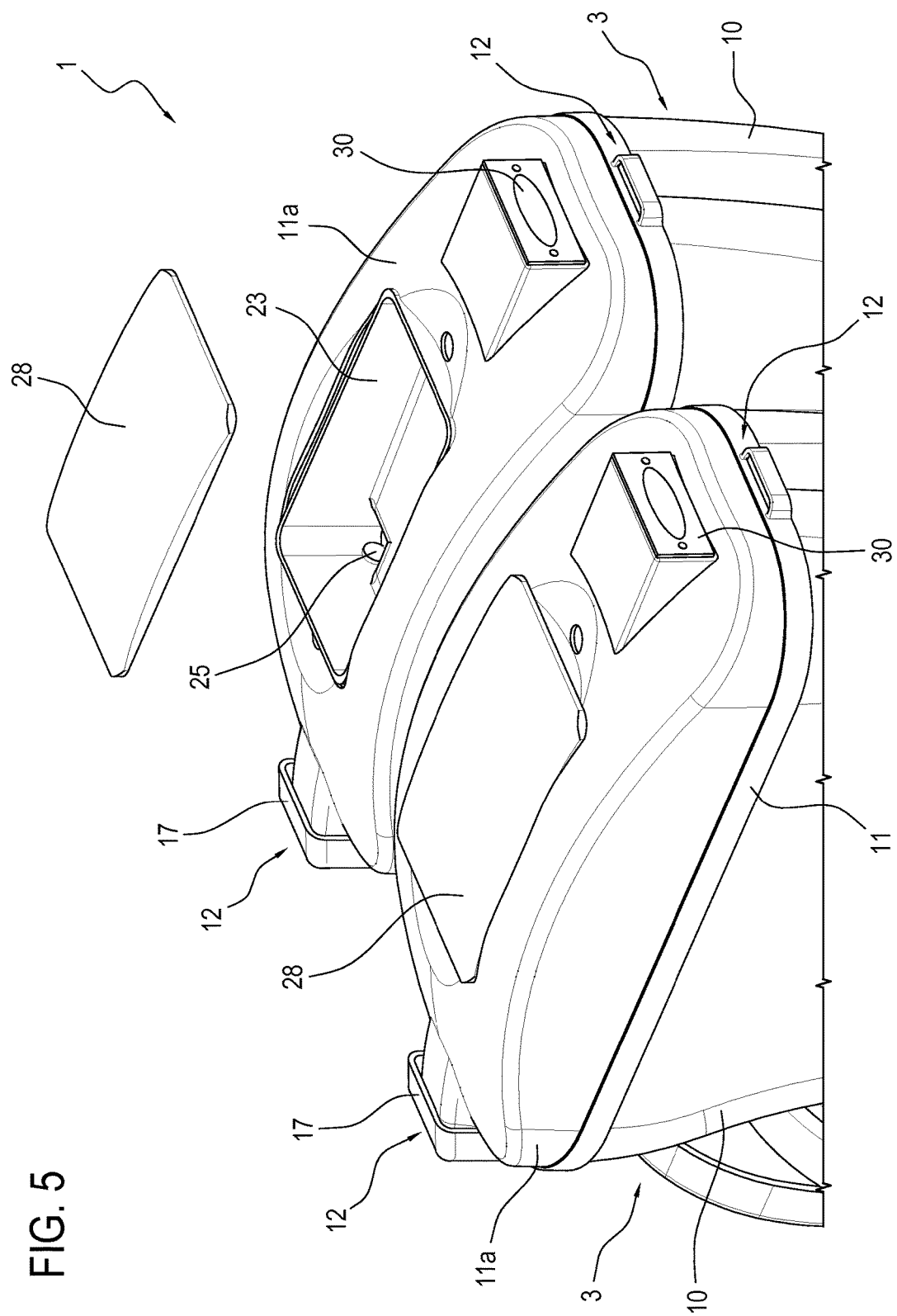
FIG. 5 is partly exploded perspective view of a portion of the machine of FIG. 1.
Figure 6:
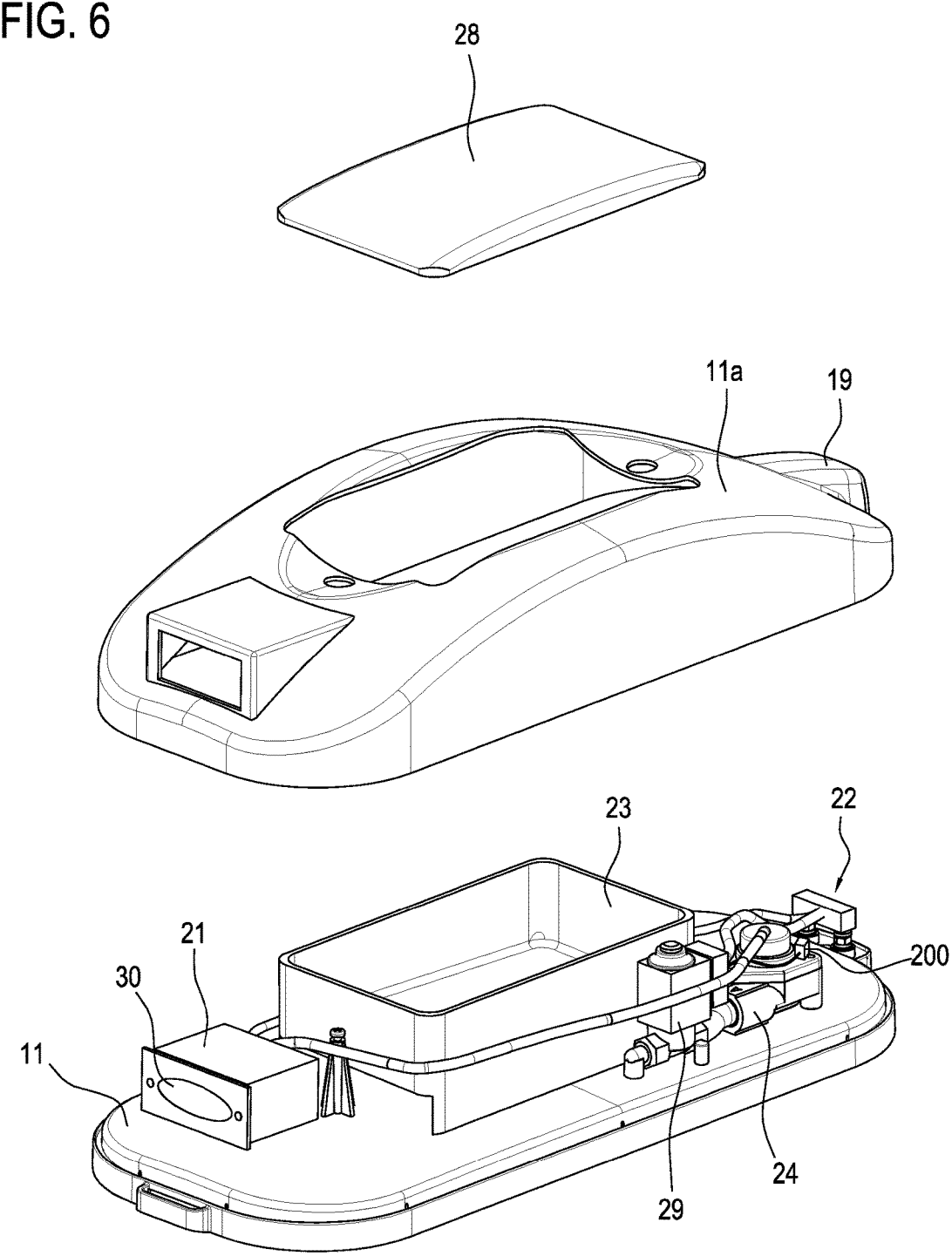
FIGS. 6, 7 and 8 are three partly exploded perspective views of a detail of the machine of FIG. 1.
Figure 7:
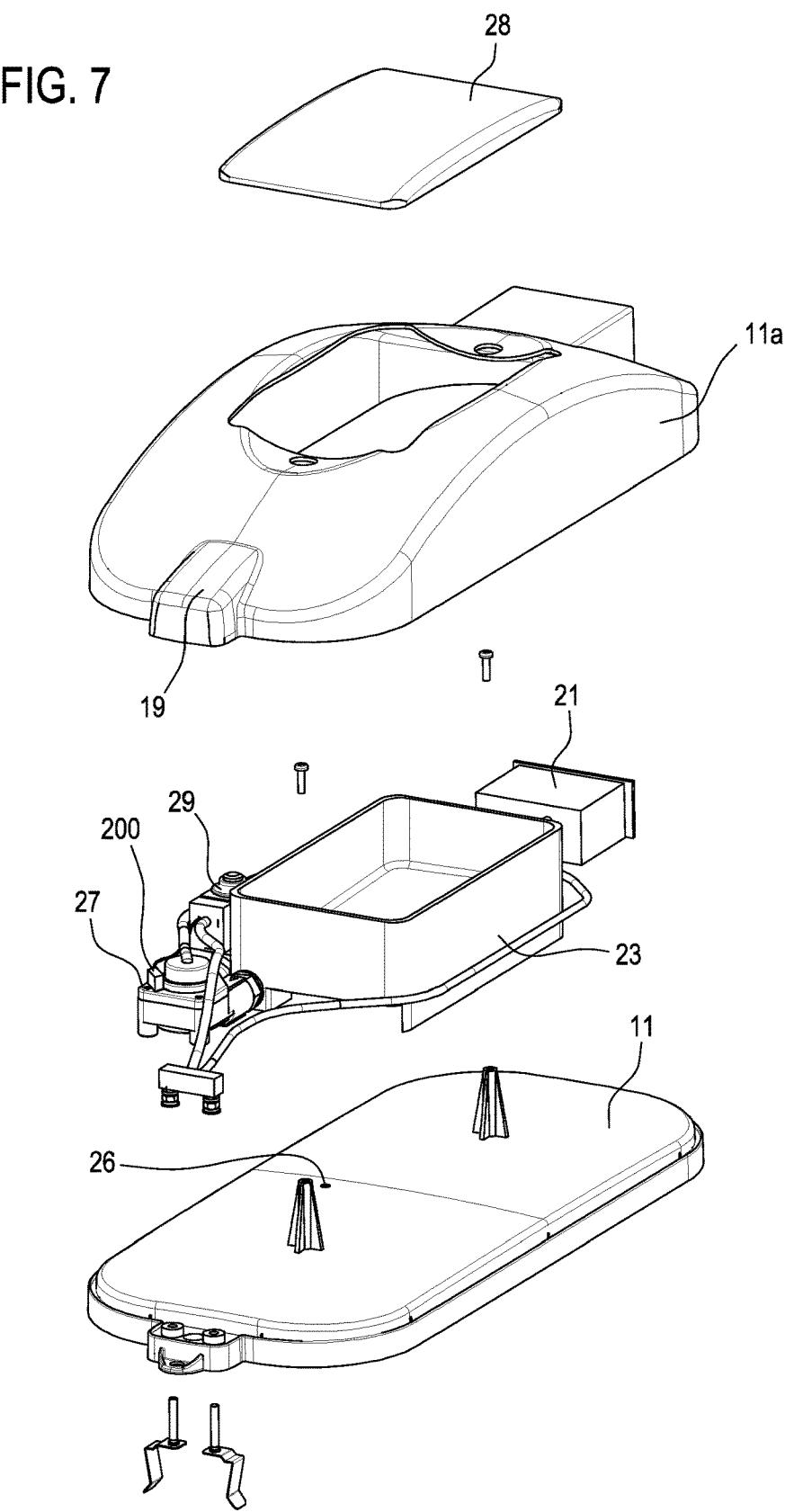
Figure 8:
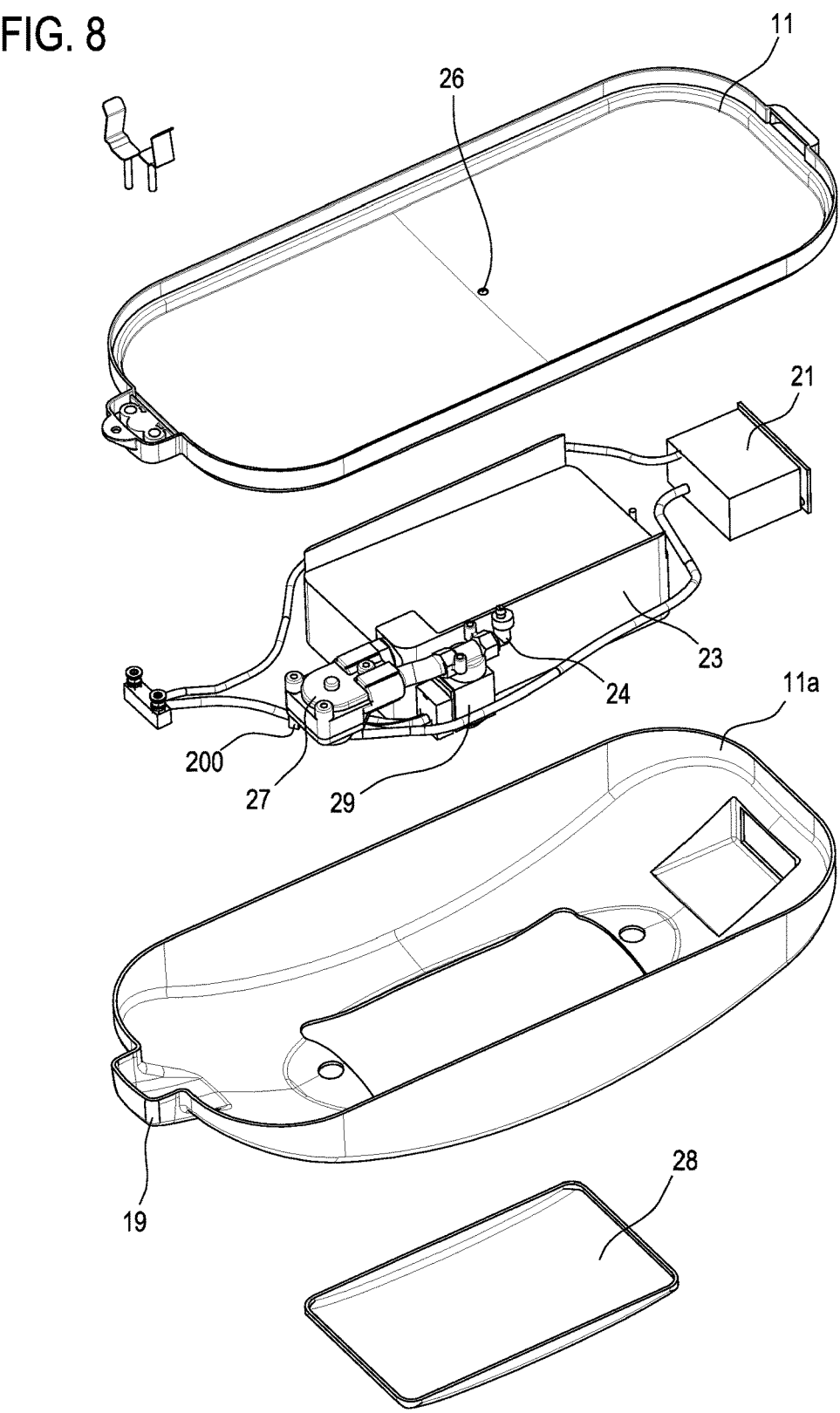
Figure 9:
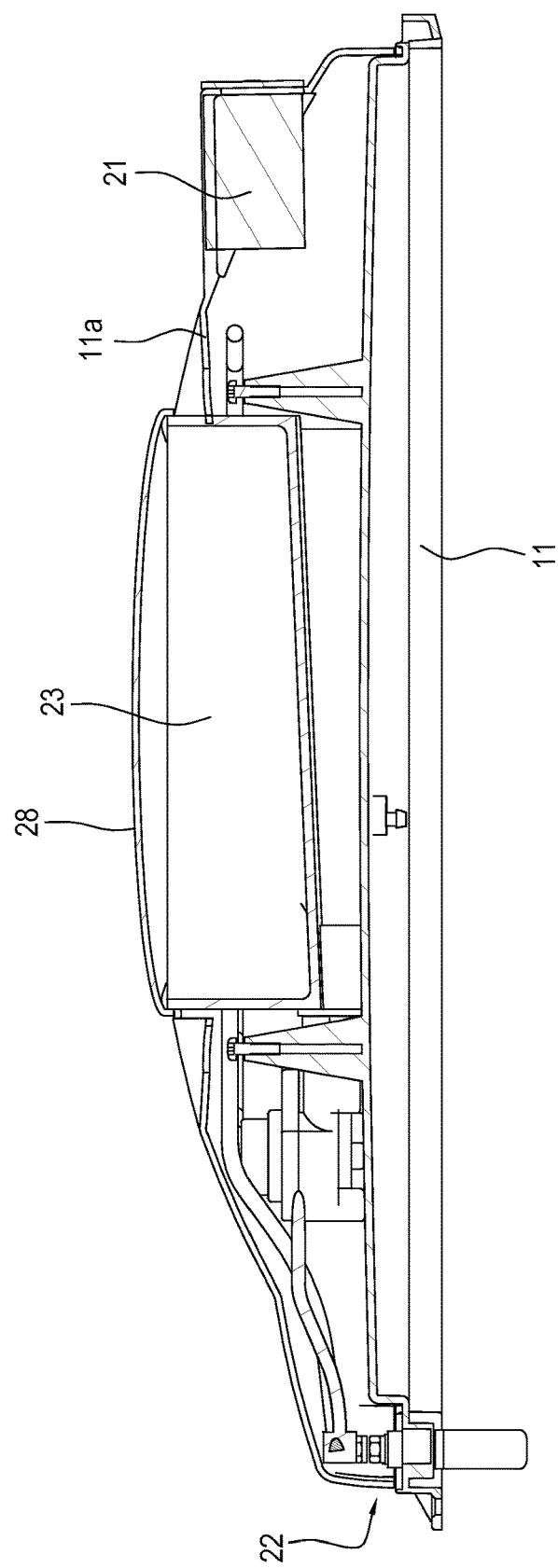
FIG. 9 is a transverse cross section of a detail of the machine of FIG. 1.

As illustrated in FIGS. 2 and 4, the portion 5 contains and partially surrounds a screw type stirrer 8 and an evaporator 9, the latter forming part of the above mentioned refrigerating circuit.

The stirrer 8 is rotationally driven about the axis 6, and around the evaporator 9, by a motor, not illustrated, housed in the base 2.

Under normal operating conditions, each chamber 3 is closed and sealed.

Further, each chamber 3 can be removed from the base 2 and divided into at least two matching parts to facilitate cleaning.

In other words, each chamber 3 is delimited by at least two walls which can be separated from each other and which are shaped to match each other in defining the chamber 3 as a whole.

In the example provided, each chamber 3 is made up of only two walls and, more precisely, a cup-shaped lower (and side) wall 10 and an upper wall 11 in the form of a lid.

These two walls substantially consist of two elements: a first element constituting the upper wall 11 and a second element 10 constituting the lower and side wall.

It should be noted that the second element has, at the back of it, a hole adapted to house the evaporator 9 and the related stirring unit 8, which remain attached to the base structure 2 when the chamber 3 is removed.

Also, the wall 11 is preferably surmounted by a removable covering shell 11a

With regard to each chamber 3, the machine 1 comprises locking means 12 for holding the two walls 10 and 11 together in a mutually coupled operating position.

This is the position adopted under the aforementioned normal operating conditions.

The locking means 12 comprise a slotted coupling element 13 at the front and a stop element 14 at the back.

Figure 3:
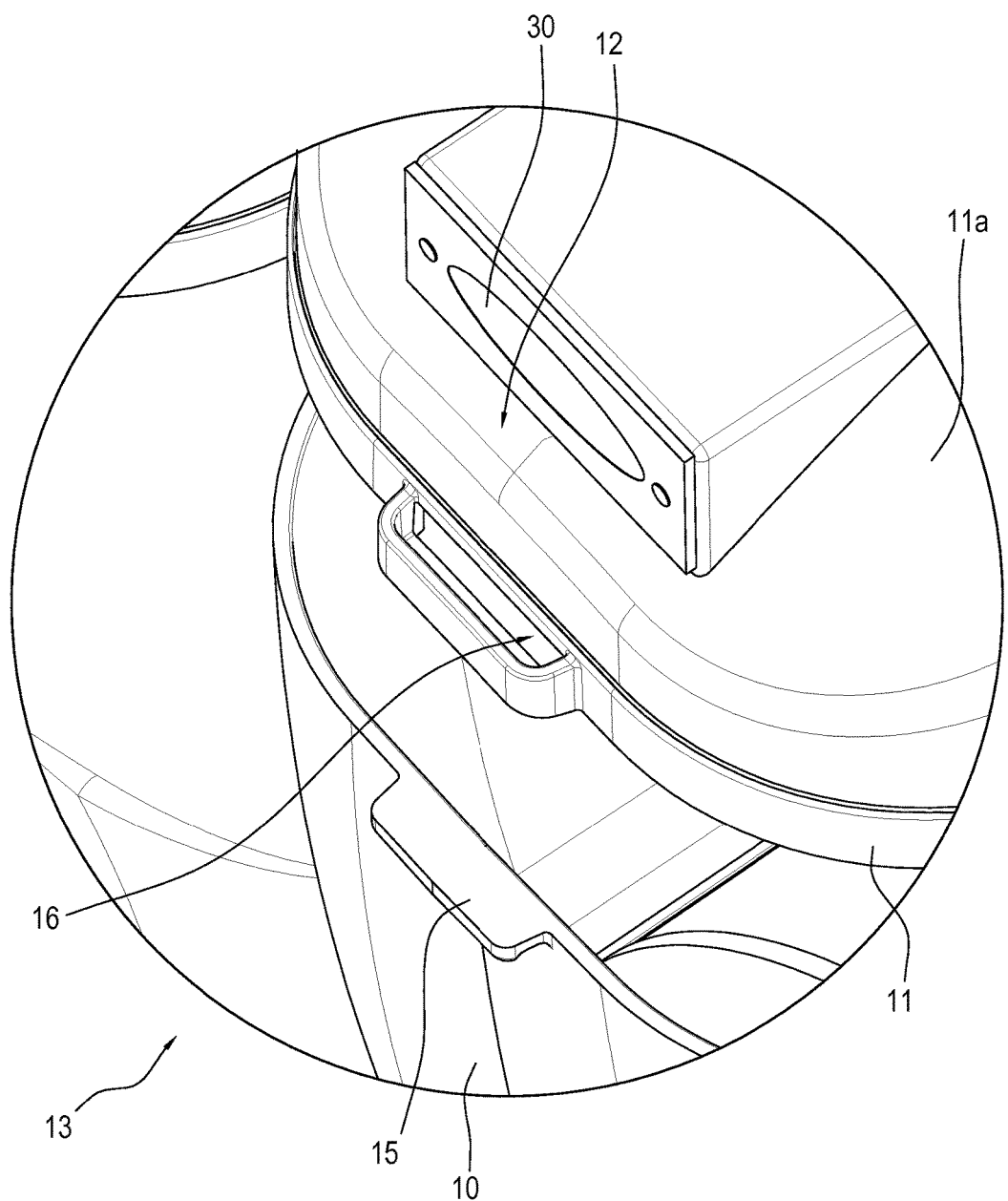
FIG. 3 shows a detail of the machine of FIG. 1 in a partly disassembled configuration.

The slotted coupling element 13, illustrated in detail in FIG. 3, is defined by a tongue 15 which projects in cantilever fashion from the upper edge of the wall 10, and a slot 16 made on the edge of the wall 11.

As better illustrated in FIG. 2, the stop element 14 is defined by a cap 17 which is supported by a shoulder 18 of the base 2 and which contains, substantially without clearance, that is to say, with a shape coupling, an end cover 19 of the shell 11a, thus preventing the latter, and hence the wall 11, from being lifted from the position where it is mounted in the machine.

The cap 17 also constitutes a fixing element for fixing in the machine 1 the assembly constituted of the walls 10 and 11 joined to each other in the aforementioned mutually coupled operating position.

In practice, once mounted in the machine, each chamber 3 cannot be opened, that is to say, it cannot be separated into its component parts (two elements). This is guaranteed both by the slotted coupling element at the front, between the tongue 15 and the slot 16, and by the cap 17 at the back, which prevents lifting.

At the same time, it is impossible to fix only the lower part of the chamber 3 in the machine because it would be impossible for the cap 17 to be used to fix the lower part in height.

As shown in FIG. 2, each chamber 3, in order to be cleaned, can be pulled away from the stirrer 8, from the evaporator 9 and from a ring seal 20 located on the shoulder 18 (that is, it is slidable relative to the base 2) by simply moving the chamber 3 towards the front of the machine in the direction of the axis 6 in such a way as to disengage the cover 19 from the cap 17. Next, by disengaging the tongue 15 from the slot 16, the chamber 3 can be opened, separated into its component parts and thus cleaned more easily.

In order to check correct mutual coupling of the walls 10 and 11 and to enable operation of the machine 1 after the check, the machine 1 is equipped with a control unit 21.

More specifically, the control unit 21 checks that an electrical contact between the walls 10 and 11 is correctly closed by means of a switch 22.

The switch 22 may be of a type with a sliding or spring contact or of any other type.

In addition to what is described above, the control unit 21 may also be provided with a unit for checking the authenticity of the walls 10 and 11, that is, for checking that the component parts of the chamber 3 are original and not imitations. Recognition of the authenticity of the walls 10 and 11 may be performed by means of a microchip or an RFID tag of known type.

To guarantee feeding to the chambers 3 during operation of the machine 1 and, at the same time, to allow the manufacturer of the machine 1 to check proper use of the machine by the customer/user, the machine 1 comprises, for each chamber 3, a tank 23 for feeding the ingredients necessary to obtain the product to be dispensed, a connecting pipe 24 between an outlet 25 of the tank 23 and an inlet 26 of the chamber 3; and a flow meter 27 positioned along the pipe 24.

The tank 23 is fixed to or formed on the top outside face of the wall 11.

The inlet 26 of the chamber 3 is defined, preferably, but not necessarily, by a through hole in the wall 11.

The upper opening of each tank 23 is a window in the shell 11a and is closed by a removable lid 28.

The tank 23 is filled manually from the top by temporarily removing the lid 28 and pouring into the tank the product ingredients in loose form, for example a mix of syrups and water and/or milk, depending on the flavor of the product to be dispensed.

In addition to the meter 27, there is mounted along the pipe 24, in series with the meter 27, a solenoid valve 29 which is also controlled by the control unit 21 to synchronize flow measurement.

The solenoid valve 29, the pipe 24, the control unit 21, the switch 22 and the meter 27 are preferably housed in the space between the wall 11 and the shell 11a.

The meter 27 makes it possible to measure, preferably in liters, the total quantity of ingredients supplied from the moment the machine is reset, that is to say, the total quantity of ingredients supplied in a defined time interval (for example, a year).

The meter 27 is preferably an electronic meter and is connected to a display 30 for displaying the flow quantity measured. The display 30 is visible to the user through a window made at the front of the shell 11a.

Preferably, also, the meter 27 is provided with a port (not illustrated) for connection to an external reading device for reading the flow quantity measured.

Alternatively, the control unit 21 is provided with a port (not illustrated) for connection to an external reading device for reading the flow quantity measured.

Preferably, also, the meter 27 and/or the control unit 21 is/are provided with an Internet connection for remotely reading the flow quantity measured.

Figure 10:
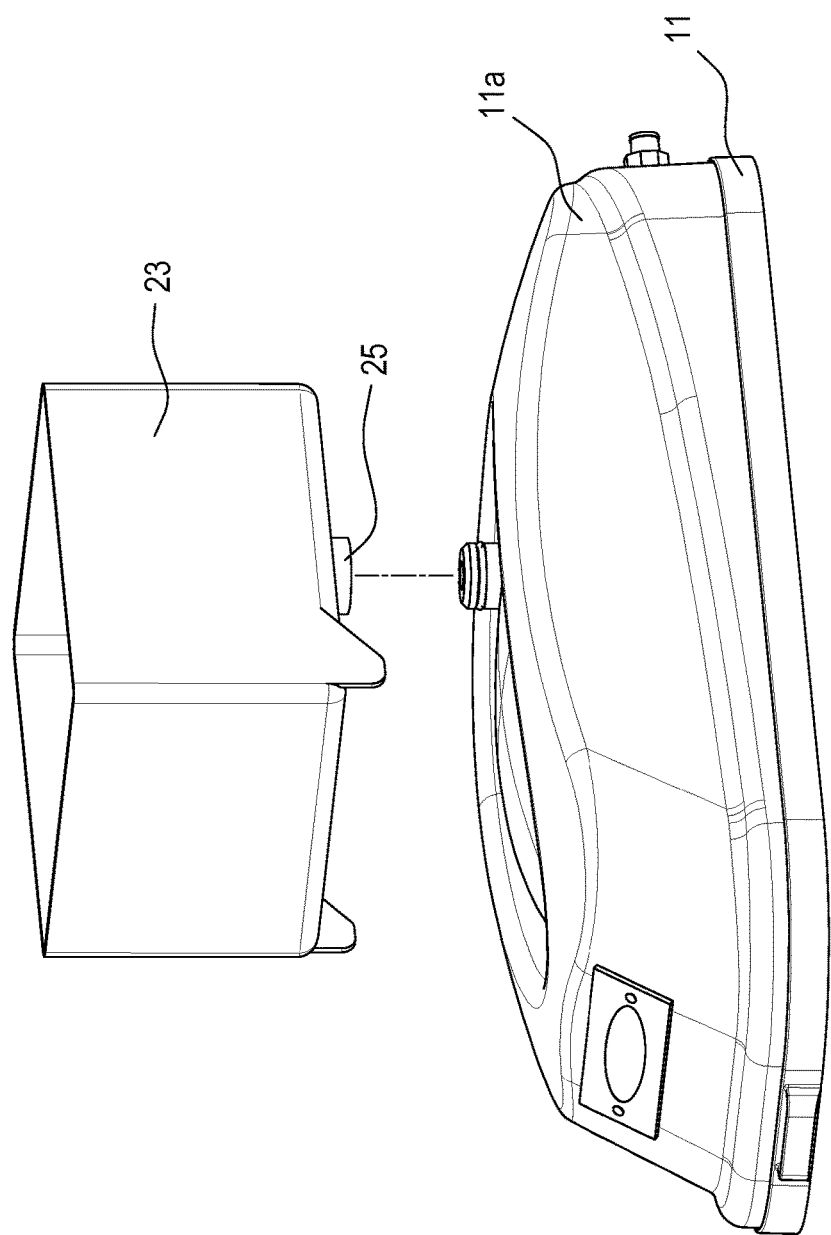
FIGS. 10 and 11 are two partly exploded perspective views of a detail of a variant embodiment of the machine of FIG. 1.
Figure 11:
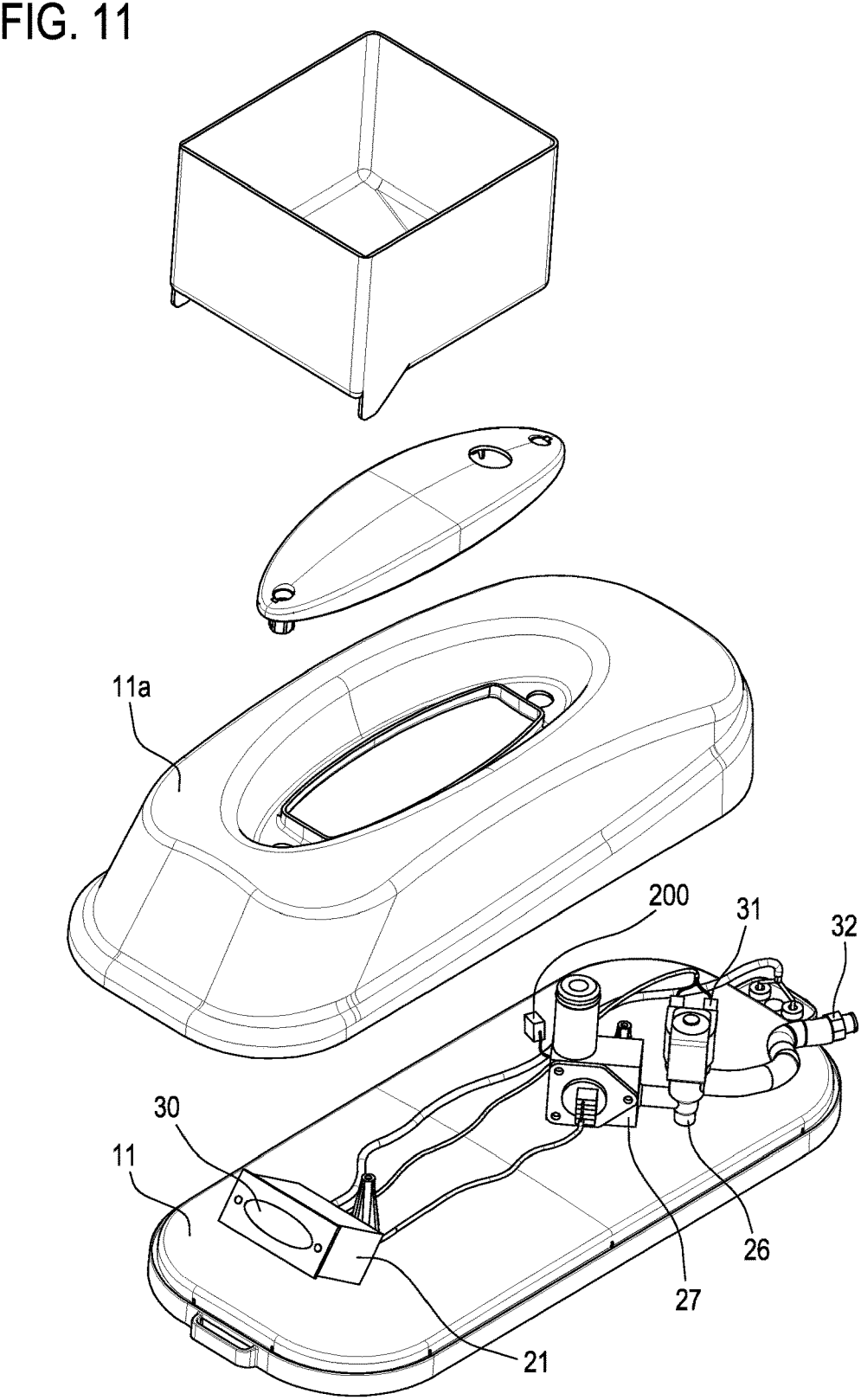

In the variant embodiment illustrated in FIGS. 10 and 11, the tank 23—being removably mounted on top of the wall 11 on the outside of the shell 11a—is separable from the wall 11, and the solenoid valve 29 is replaced with a three-way solenoid valve 31, comprising a way in leading to the outlet 25 of the tank 23, a first way out leading to the inlet 26 of the chamber 3 and a second way out leading to a duct 32 for drainage outside the chamber 3.

More precisely, to ensure that the meter 27 works only when product ingredients are fed in and not, for example, when the fluid passing through is a cleaning fluid, the control unit 21 measures the flow only when and until the solenoid valve 31 is in the state where the first way out is open and the second way out is closed. Switching the state of the two ways out, following a cleaning operation, causes the control unit 21 to inhibit measurement of the flow through the meter 27.

In effect, it should be noted that the liquid fed into the tank 23 is channeled either through the meter 27 or through the drainage duct 32, alternatively, depending on the state of the solenoid valve 31.

During cleaning, therefore, the cleaning liquid is transferred from the tank 23 to the drainage duct 32, allowing the feed components of the machine 1 to be cleaned in place.

Thus, the cleaning fluid is not included in the measurement carried out by the meter 27.

During normal operation, on the other hand, the basic ingredients are transferred from the tank 23 to the inlet 26 by way of the meter 27.

In a further variant embodiment, not illustrated, the machine 1 may be provided with a single chamber 3, that is to say, it may have a single production and dispensing line instead of two side by side.

It should be noted, more in general, that the machine 1 is equipped with a device for detecting the presence of the lid 28 (of any type) adapted to detect the coupling of the walls 10 and 11 and the base 2.

The device for detecting the presence of the lid allows enabling operation of the machine 1 when it detects that the walls 10 and 11 and the base 2 are coupled together (operating configuration of the machine 1).

In other words, the control unit 21 receives—from the device for detecting the presence of the lid 28—a signal which enables operation when the walls 10 and 11 are coupled to the base 2 and, consequently, enables the machine 1 to operate (that is to say, enables operation of the actuators, such as the compressor, for example).

In a non-limiting example embodiment, the device for detecting the presence of the lid comprises a reed switch, associated with one of either the walls 10 and 11 or the base 2, and a magnet, associated with the other of either the walls 10 and 11 or the base 2.

This switch allows detecting a signal representing a condition whereby the walls 10 and 11 are coupled to the base 2 in order to allow enabling the machine actuators to operate if the walls 10 and 11 are coupled to the base 2.

The machine 1 described above, in all its variants, achieves the preset aim. In effect, the machine manufacturer, based on the amount of ingredients supplied to the customer from a given time, which might, for example, be the effective date of the supply contract, may at any time check whether or not machine production has exceeded a limit value attributable to the production capacity of the machine with the amount of ingredients supplied. In other words, by simply taking readings from the meter 27, the machine manufacturer can check whether the customer/user has used only the product mixes or syrups supplied by the manufacturer itself.

At the same time, the machine 1 is easy to clean since the chamber 3, which can be assembled and disassembled, guarantees full accessibility to all of its parts.

Further, the possibility of assembling and disassembling the chamber 3 for cleaning purposes does not adversely affect the guarantee that the chamber 3 cannot be tampered with by someone with fraudulent intent in connection with the operation of the machine 1. In effect, it is not possible to use the chamber 3 on the machine if the chamber has not been properly preassembled and locked in the closed and sealed configuration.

According to another aspect, the machine comprises a memory and a processing unit 200. The processing unit 200 is connected to the flow meter 27, which is mounted along the pipe 24, in order to receive therefrom a signal relating to the flow of basic product along the pipe.

Also, the memory is configured to allow storing a value of product flow measured by the flow meter in a defined period.

The processing unit 200 is configured to update (read and write) the value of product flow in the memory based on the signal received from the flow meter, so as to keep track of the product which flows along the pipe over a defined period of time.

It should be noted that the machine is preferably provided with controls allowing the user to reset the product flow value in the memory.

The machine is preferably also provided with a display interface (display or communication port) and controls configured to be activated in order make the value present in the memory available to the communication interface.

Thus, activating the controls advantageously makes it possible for the operator to know immediately the value of product flow along the pipe 24 (flow proportional to the finished product made in the machine) in a defined period.

According to another aspect, the control unit 21 and/or the display 30 may be mounted on the base 2.

Also defined according to the invention is a method for making and dispensing liquid or semi-liquid food products, comprising the following steps:

preparing a machine as described in the foregoing;

placing basic ingredients in the tank 23 for feeding the ingredients;

transferring the basic ingredients though the connecting pipe 24 from the tank 23 for feeding the ingredients to the chamber 3;

measuring, during the transferring step, using the flow meter 27, a parameter representing the quantity of basic ingredients transferred through the connecting pipe 24;

saving the parameter representing the quantity of basic ingredients transferred;

activating the stirring unit 8 and the refrigerating system in order to process the basic ingredients.

In a further step, method comprises displaying an indication representing the quantity of basic ingredients transferred through the connecting pipe 24 in a defined period of time.

The invention described above is susceptible of industrial application and may be modified and adapted in several ways without thereby departing from the scope of the inventive concept. Moreover, all the details of the invention may be replaced with technically equivalent elements.

What is claimed is:

1. A machine for making and dispensing a liquid or semi-liquid food product, comprising:

a chamber for containing and processing the food product to be dispensed and which is closed during use, a dispensing tap positioned near a bottom of the chamber, a stirring unit including a motor and a stirrer driven by the motor, an evaporator of a refrigerating circuit positioned inside the chamber;

wherein the chamber includes an inlet, a feeding tank, including an outlet, for feeding into the chamber basic ingredients needed for obtaining the food product to be dispensed;

a connecting pipe between the outlet of the feeding tank and the inlet of the chamber; and a flow meter positioned along the connecting pipe;

a base structure to which the chamber can be coupled, wherein the feeding tank is positioned over at least a portion of the chamber to feed the basic ingredients into the chamber by gravity;

wherein the chamber is delimited by at least two walls which are separable from each other and uncouplable from the base structure, a locking mechanism including an engagement surface for engaging a surface of the chamber for holding the at least two walls together in a mutually coupled operating position;

wherein the locking mechanism further includes a slotted coupling element at a front of the locking mechanism and a stop element at a back of the locking mechanism;

wherein the slotted coupling element includes a tongue which projects as a cantilever from an upper edge of a first wall of the at least two walls and a slot positioned on an edge of a second wall of the at least two walls;

wherein the stop element includes a cap supported by a shoulder of the base structure, the cap for receiving and coupling the at least two walls in the mutually coupled operating position to prevent the at least two walls of the chamber from being lifted from the base when the at least two walls are in the mutually coupled operating position;

wherein the chamber includes an opening in a rear wall thereof shaped and sized to receive the evaporator internally of the chamber when the chamber is coupled to the base structure;

a processing unit including a processor, the processor connected to the flow meter and programmed to receive from the flow meter a signal relating to a flow of basic ingredients along the connecting pipe, and the processor also connected to a memory and programmed to update a value of the flow of basic ingredients memorized in the memory based on the signal received from the flow meter to keep track of an amount of the basic ingredients which flows through the connecting pipe over a defined period of time.

2. The machine according to claim 1, and further comprising a controller for checking a correct mutual coupling of the at least two walls and for enabling machine operation after the checking.

3. The machine according to claim 2, and further comprising a solenoid valve positioned along the connecting pipe and controlled by the controller.

4. The machine according to claim 3, wherein the solenoid valve is a three-way solenoid valve comprising a path in leading to the outlet of the feeding tank, a first path out leading to the inlet of the chamber and a second path out leading to a duct for drainage outside the chamber.

5. The machine according to claim 1, wherein the at least two walls are respectively a cup-shaped lower wall and an upper lid.

6. The machine according to claim 1, and further comprising a display operatively connected to the flow meter for displaying a flow quantity measured.

7. A method for making and dispensing a liquid or semi-liquid food product, comprising:
providing a machine for making and dispensing the liquid or semi-liquid food product, comprising:
a chamber for containing and processing the food product to be dispensed and which is closed during use,
a dispensing tap positioned near a bottom of the chamber,
a stirring unit including a motor and a stirrer driven by the motor,
an evaporator of a refrigerating circuit positioned inside the chamber;
wherein the chamber includes an inlet,
a feeding tank, including an outlet, for feeding into the chamber basic ingredients needed for obtaining the food product to be dispensed;
a connecting pipe between the outlet of the feeding tank and the inlet of the chamber; and a flow meter positioned along the connecting pipe;

a base structure to which the chamber can be coupled, wherein the feeding tank is positioned over at least a portion of the chamber to feed the basic ingredients into the chamber by gravity;

wherein the chamber is delimited by at least two walls which are separable from each other and uncouplable from the base structure, a locking mechanism including an engagement surface for engaging a surface of the chamber for holding the at least two walls together in a mutually coupled operating position;

wherein the locking mechanism further includes a slotted coupling element at a front of the locking mechanism and a stop element at a back of the locking mechanism;

wherein the slotted coupling element includes a tongue which projects as a cantilever from an upper edge of a first wall of the at least two walls and a slot positioned on an edge of a second wall of the at least two walls;

wherein the stop element includes a cap supported by a shoulder of the base structure, the cap for receiving and coupling the at least two walls in the mutually coupled operating position to prevent the at least two walls of the chamber from being lifted from the base when the at least two walls are in the mutually coupled operating position;

wherein the chamber includes an opening in a rear wall thereof shaped and sized to receive the evaporator internally of the chamber when the chamber is coupled to the base structure;

placing basic ingredients in the feeding tank;

transferring the basic ingredients through the connecting pipe from the feeding tank to the chamber for containing and processing the food product to be dispensed;

measuring, during the transferring step, using the flow meter, a parameter representing a quantity of basic ingredients transferred through the connecting pipe;

saving the parameter representing the quantity of basic ingredients transferred;

activating the stirring unit and the refrigerating circuit to process the basic ingredients in the chamber;

receiving from the flow meter a signal relating to a flow of basic ingredients along the connecting pipe, and connecting to a memory to update a value of the flow of basic ingredients memorized in the memory based on the signal received from the flow meter to keep track of an amount of the basic ingredients which flows through the connecting pipe over a defined period of time.

8. The method according to claim 7, and further comprising displaying an indication representing the quantity of basic ingredients transferred through the connecting pipe in a defined period of time.

* * * * *